Dec. 4, 1923.
B. B. TABOR ET AL
DIRIGIBLE HEADLIGHT
Filed Dec. 13, 1922
1,476,656
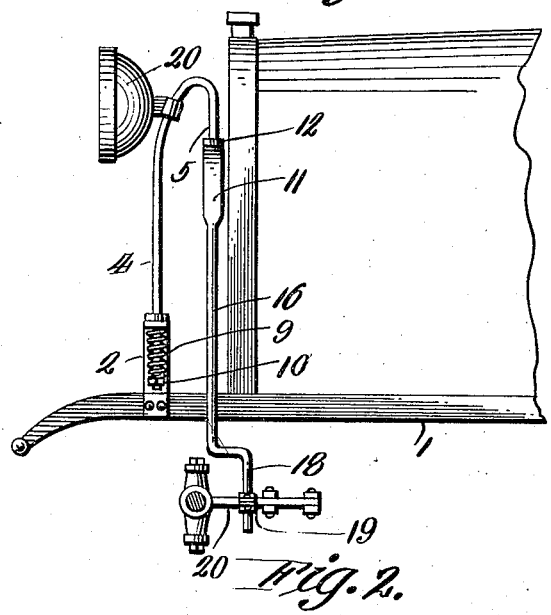
Fig. 1.
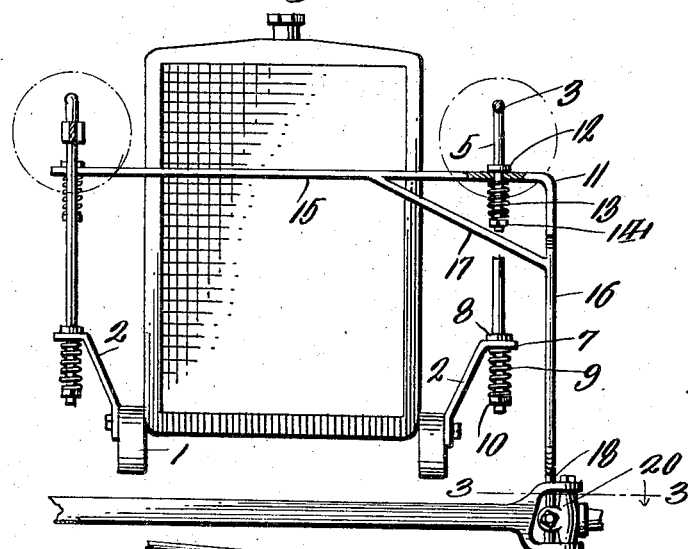
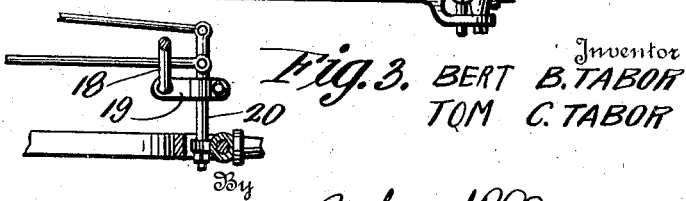
Fig. 3.
Inventor
BERT B. TABOR
TOM C. TABOR Patented Dec. 4, 1923.

1,476,656

UNITED STATES PATENT OFFICE.

BERT B. TABOR AND TOM C. TABOR, OF POTTERSVILLE, MISSOURI.

DIRIGIBLE HEADLIGHT.

Application filed December 13, 1922. Serial No. 606,669.

*To all whom it may concern:*

Be it known that we, BERT B. TABOR and TOM C. TABOR, citizens of the United States, residing at Pottersville, in the county of Howell and State of Missouri, have invented certain new and useful Improvements in a Dirigible Headlight, of which the following is a specification.

The present invention relates to a dirigible headlight and has for its principal object to provide means whereby the headlights on an automobile may be turned and directed in the direction in which the vehicle is traveling at all times so that the road ahead will be illuminated whereby the chauffeur may drive with comparative safety at night.

Another important object of the invention is to provide a mechanism of this nature which is resiliently mounted so as to compensate for the relative movement of the chassis in relation to the wheels of the automobile.

A still further important object of the invention is to generally improve upon devices of this nature by providing a simple and efficient construction, one which is reliable in operation, inexpensive to manufacture, durable, and well adapted to the purpose for which it is designed.

With the above and numerous other objects in view as will appear as the description progresses, the invention resides in certain novel features of construction, and the combination and arrangement of parts as will be hereinafter more fully described and claimed.

In the drawing

Figure 1 is a fragmentary side elevation of the forward portion of an automobile showing the dirigible headlights mounted thereon, Figure 2 is a front elevation thereof portions of the dirigible headlights being shown in section, and Figure 3 is a detail section taken substantially on the line 3—3 of Figure 2 looking in the direction of the arrow.

Referring to the drawing in detail it will be seen that the chassis 1 is of conventional construction and has fixed to its forward ends a pair of brackets 2. A pair of headlight supporting members 3 are associated with these brackets 2. Each supporting member 3 is of substantial U-shaped formation being inverted and having a forward leg 4 longer than a rear leg 5. The forward leg 4 extends through an aperture lip 7 of the bracket 2 and a collar 8 is fixed to this leg resting on top of the lip 7 and a spring 9 is fixed on the end of this leg 4 and is supported and adjusted by a nut 10. The shorter leg 5 extends through an aperture provided in the actuating arm 11. A collar 12 is formed on the leg 5 adjacent its end and rests on the arm 11 as is indicated in Figure 2 and a spring 13 is disposed about the end of this shorter leg 5 being supported and adjusted by a nut 14 so as to bear against the actuating arm 11. This actuating arm 11 is of substantial L-shaped formation the horizontal portion 15 thereof being braced in relation to the vertical portion 16 by the rod 17. The vertical portion 16 of the actuating arm 11 terminates in an offset extension 18 which is clamped at 19 to the steering knuckle 20 of the automobile.

As the steering knuckle is actuated by the usual steering mechanism, not shown, the actuating arm 11 will be moved transversely of the automobile thereby turning the supporting members 4 thus causing the headlights 21 supported thereby to throw their light directly in the path of the front wheels that is in the direction in which the automobile is traveling. The springs 9 and 13 will compensate for the relative movement between the chassis 1 and the wheels of the automobile which is caused by roughness in the road and the like.

We have, in the present instance, shown and described the preferred embodiment of our invention which will give in practice satisfactory and reliable results, and it is to be understood that the same is susceptible of modification in various particulars without departing from the spirit or scope of the invention or sacrificing any of its advantages.

Having thus described our invention what we claim as new is:—

In combination, an automobile chassis, a bracket on the chassis, an inverted U-shaped supporting member having one leg revolvably and resiliently supported by the bracket, an L-shaped actuating arm resiliently connected with the other leg of the supporting member and a steering knuckle attached to the actuating arm.

In testimony whereof we affix our signatures in presence of two witnesses.

BERT B. TABOR.
TOM C. TABOR.

Witnesses:
M. E. Morrow,
E. E. Thornburgh.